United States Patent [19]
Diamond

[11] Patent Number: 4,682,450
[45] Date of Patent: Jul. 28, 1987

[54] COMBINATE POLYHEDRA

[76] Inventor: Gary C. Diamond, 671 Landfair #9, Los Angeles, Calif. 90024

[21] Appl. No.: 760,541

[22] Filed: Jul. 30, 1985

[51] Int. Cl.⁴ .............................................. C04B 1/32
[52] U.S. Cl. ...................................................... 52/81
[58] Field of Search ...................... 52/81, DIG. 10, 80

[56] References Cited

U.S. PATENT DOCUMENTS

| | | | |
|---|---|---|---|
| 1,997,022 | 4/1935 | Stalker | 52/DIG. 10 |
| 2,839,841 | 6/1958 | Berry | 52/DIG. 10 |
| 2,992,829 | 7/1961 | Hopkins | 52/DIG. 10 |
| 3,093,461 | 6/1963 | Woolven | 52/DIG. 10 |
| 3,568,381 | 3/1971 | Hale | 52/DIG. 10 |
| 3,611,620 | 10/1971 | Perry | 52/DIG. 10 |
| 3,974,611 | 8/1976 | Satterthwaite | 52/DIG. 10 |

OTHER PUBLICATIONS

Mathematical Models by Cundy & Rollett © Oxford at the Clarendon Press 1961 pp. 96,97,98,99,129 and 137.
Polyhedron Models by Wenninger © 1971 Cambridge Press pp. 38,39,40,41,46,63 and 48.

Primary Examiner—Henry E. Raduazo

[57] ABSTRACT

This invention relates in general to polyhedral models and in particular to those models which can be more readily of use in architectural or engineering applications. A new type of complex concave polyhedron is disclosed which is formed from six-sided polyhedron units.

3 Claims, 4 Drawing Figures

U.S. Patent  Jul. 28, 1987  4,682,450
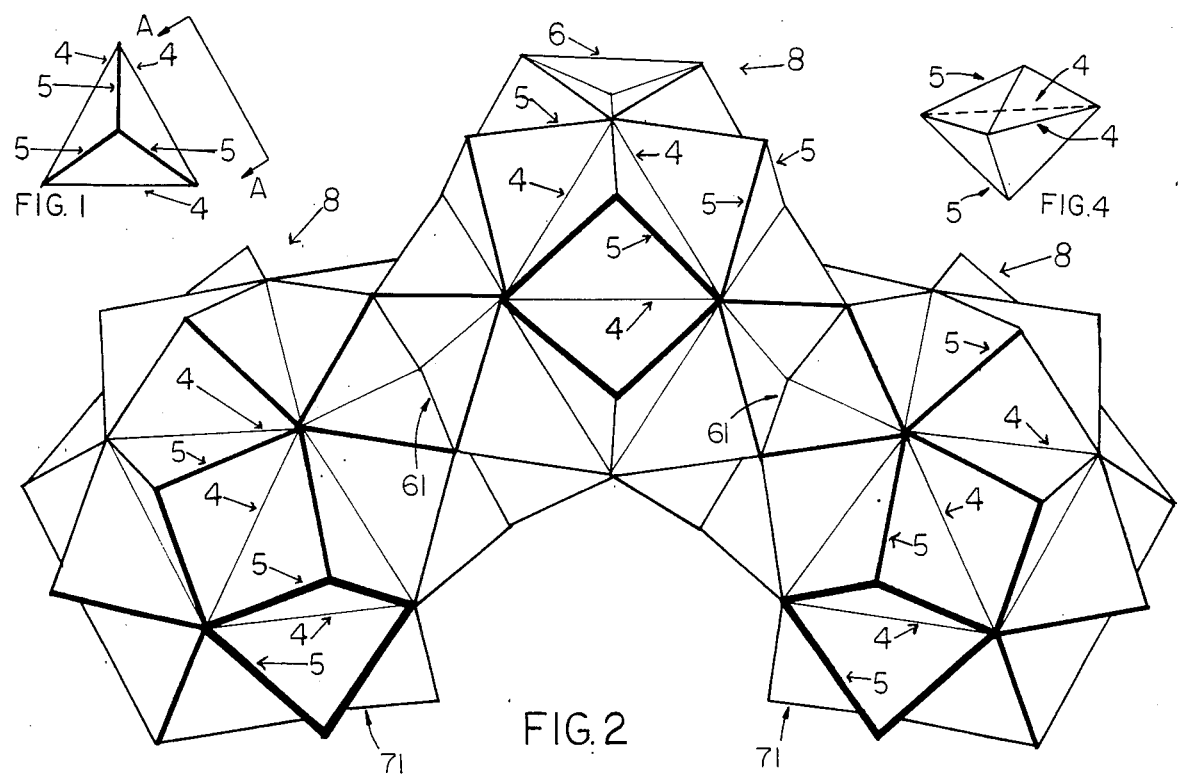
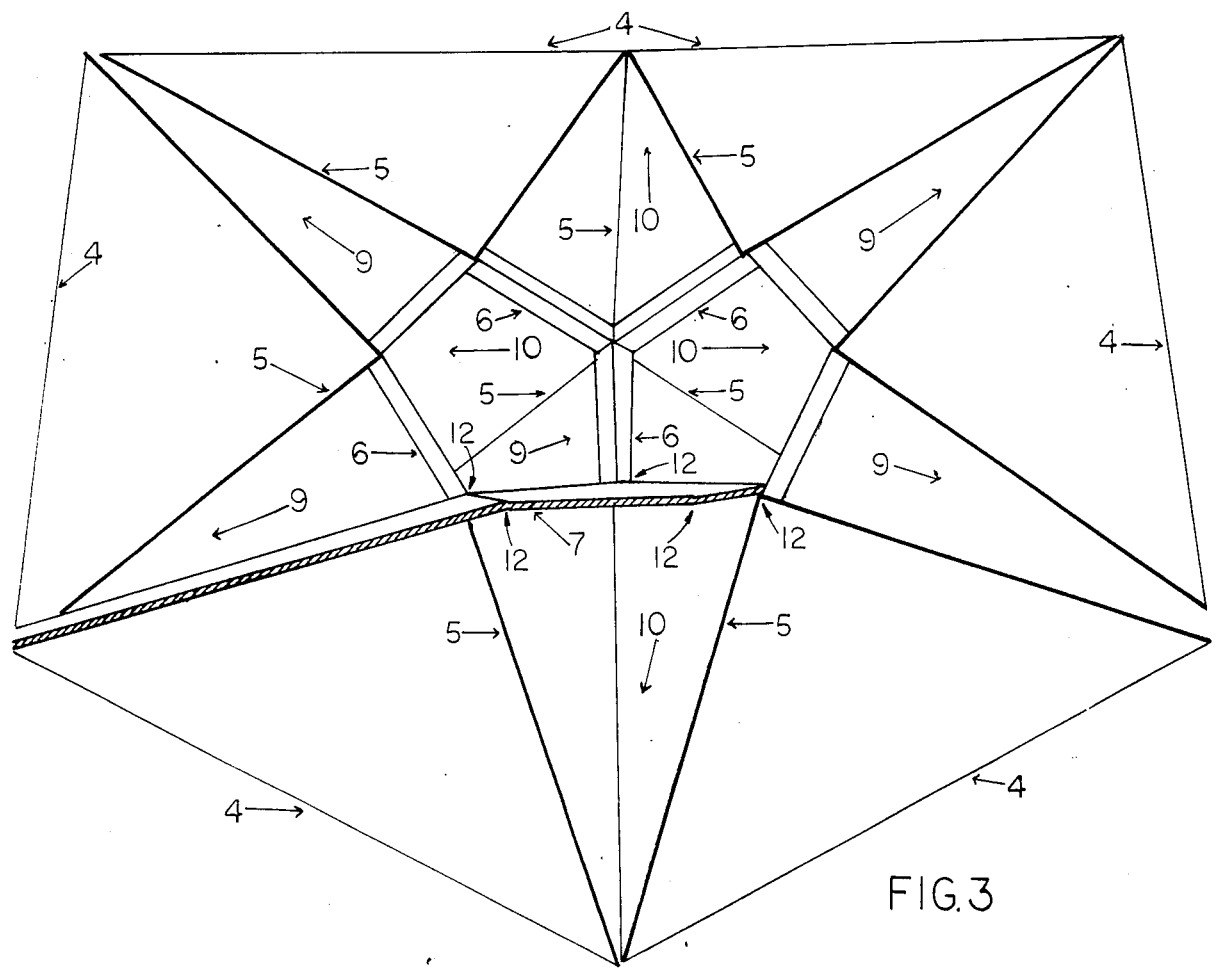

COMBINATE POLYHEDRA

BACKGROUND OF THE INVENTION

In the prior art of geometric models, and in the particular area of polyhedral frameworks, structures are known which comprise a single completed coherent membranal surfaces, or singular planar framework. These structures can be said to be one sided in that they have an exterior polyhedral surface which provides the form by which the object is defined. Examples would be called twelve-sided or twenty-sided or the like. The interior of all prior polyhedrons can only be said to be the underside of the exterior form, having identical planes and edges, and therefore have the same structure inside and outside. These structures of the prior art define a singular exterior form, and the interior void space remaining has an essentially identical perimeter to that of the initial polyhedron minus the dimension of the depth of the structure, either membrane or framework. In addition, models of the prior art are conceived of as essentially comprised of combinations of linear vectors, or strut members, which combine to create the geometry of the given model. Polyhedral models have been developed which are unique in their geometry, are self-referential in that they are entirely mathematical in conception and advantage, and therefore, exist in a kind of pure conceptual mathematical domain, which is far removed from the pragmatic reality of the world of engineering and architectural structures. Essentially then, the prior art of polyhedral models is in many ways an elegant discipline which unfortunately does not have a meeting point or correspondent level with that of the practical world. Complex Polyhedral models are beautiful but curiously unusable constructs.

An example of this separation of concept and pragmatics may be shown by examining the work of R. Buckminister Fuller, in particular his Geodesic Domes. These models, advanced the teaching in the field of Solid Geometry by providing structures which had greater strength per unit weight than structures previously known. But, because they are conceived of as essentially shell-like structures, their use in reality shows serious limitations. The outside of the structure is always an elegant triangulated framework shell structure, but upon entering the inside space created by this structure, one will find a traditional rectilinear post and beam-like structure built within the Geodesic Dome. This interior structure is completely separate from the shell both conceptually and structurally. This is because the Geodesic Domes solve one problem only, that of skin or exterior. But they do not consider the problem of the housing of and differentiation of interior volumes to satisfy other requirements of storage, either of material storage, or human occupation, nor the implications of these further needed requirements in regards to gravity. Of course this also means that in the prior art the exterior loads such as roof loads, winds loads, and earthquake loads, are carried in the exterior shell structure according to the prior art, and the interior structural loads, floor loads, etc. are carried by the separate interior structure. This, of course is a non-unified way of comprising a functional structure, and it is obvious that under severe loading conditions, the two different structural systems may indeed deflect or act in conflict with each other. What is needed is a model having some of the advantages of the triangulated framework shell structures similar to that known in the prior art, but also having some additional interior differentiation and interior structure, that is united to the exterior frame.

These problems are also present in the other prior art models of solid geometry particularly that of polyhedral models, and they have therefore not found a domain of convenient or efficient usage in engineering or architectural practice.

No polyhedrons have been developed with the specific purpose of housing functions of different type, whether that be two chemicals of different nature or spaces divided into circulation and various other occupancies for human architectural or other usage.

The prior art has evolved from empirical work done centuries ago, to the present, but only using several known methods. These methods include stellation, and the formation of dual models. These methods always rely on the formation and building of a polyhedron from the inside and proceeding outward. Building upon the known, the prior art has found only advances that are extensions of the known art. This simple but critical impediment has limited the advance of the catalog of known polyhedrons. It is because of this bias that no substantially different polyhedrons have been developed. What is need is a different method of generating new polyhedrons.

No single device or model of the prior art can by using only one step, form both a rigid exterior framework and a differentiated interior structure which forms several different interior spaces, all of which is rigid and united to the exterior framework. Such a unified structure is needed.

SUMMARY OF THE INVENTION

The primary structure of the present invention is a four-sided convex polyhedron having an equilateral triangle as a base having an edge length x, and having the three additional sides with their remaining edges of length 0.70711 x. Two such convex polyhedrons may be joined into a structure being a six-sided convex polyhedron. According to the present invention, forty of these four-sided convex polyhedrons are united in an array which will produce a sixty-sided exterior concave polyhedron. These convex polyhedrons may be prefabricated as in a whole, or may be assembled from linear strut members of two different lengths only, being x, and 0.70711 x.

These convex polyhedrons are assembled in an array, not about any other preexisting structure, but attached only to themselves to form a space enclosing structure having advantages over models known to the prior art.

The structure according to the present invention comprises a geometric model of a concave polyhedron having a single completed coherent fully closed-sided membranal surface or singular framework at the exterior of the structure and an additional discrete similar structure at the interior of the model. The structure according to the present invention therefore, is not one-sided in the sense that it has an exterior polyhedral surface which does not adequately or fully describe the model. The interior of the model according to the present invention is not merely the underside of the exterior form, but has different distinct and useful structures integrated structurally and functionally.

The model according to the present invention is conceived of as formed from the combination of several convex polyhedrons, and as such achieves a more complex and useful structure than is existent in the prior art.

This method is important and material to what is new about the present invention as it allows for the building of a model through an additive synthesis of a more differentiated level than that of the prior art, that is, the building blocks of the present invention are already space enclosing polyhedrons. This allows for the assembly of a model which may proceed from the inherent characteristics of the convex polyhedron having base x, and sides of 0.70711 x. The present invention does not build around any existing known structure, and therefore does not arrive at a model that is a dual model or a stellate model according to the prior art.

The model taught according to the present invention, is functional in conception and advantage, being formed of volumetric units, which combine to form a more useful structure than is existent in the prior art, by enclosing several different types of space. The present invention provides a complex polyhedral model which is more pragmatic and usable than those of the prior art.

The separate exterior structure and the interior structure of the present invention are abutted together and are united in a fully rigid array.

Floor-like elements may be easily attached to and structurally united to the structure according to the present invention.

In contrast to the prior art, the exterior loads are carried both in the exterior elements of the model and in the interior elements of the model. The same is true of the interior loading.

What is provided in the present invention is a geometric model having some of the advantages of the triangulated framework shell structures similar to that known in the prior art, but also having some additional interior differentiation and interior structure, that is united with the exterior frame.

The structural model taught in the present invention would provide for a more convenient and efficient usage in engineering and architectural practice than is existent in the prior art. The polyhedrons according to the present invention may be developed with a specific purpose of housing several functions of different type, whether that be two chemicals of different nature, or spaces divided into circulation and various other occupancies for human architectural or other usage, and as such, may be wired, plumbed, insulated, or whatever is required at the level of the initial six-sided convex polyhedron module, therefore providing a more useful a model than exists in the prior art.

The model as taught according to the present invention can by using only one step, specifically that of assembling several six-sided convex polyhedrons to each other, in a previously unknown array, form both a rigid exterior framework and a differentiated interior structure which forms several different interior spaces, all of which is rigid and united to the exterior framework. Such a unified structure is a useful addition to the catalog of known geometric models.

In a preferred embodiment according to the present invention, as is shown in FIGS. 1 through 3, the six-sided convex polyhedrons are joined around several points in groups of five, such that five edges of length 0.70711x are located substantially in the same plane, thereby allowing for a widely distributed and stable anchorage to a flat foundation grade, thus making for expediency in siting the structure. This plane also allows for the easy joining together of several concave polyhedrons according to the present invention. In the preferred embodiment, five additional vertices of the convex polyhedrons at the interior of the structure, are also oriented in a plane parallel to the plane of foundation anchorage previously described, thus allowing for a floor level to be anchored to the structure in a manner parallel to the foundation, which may be thereby integrated to the entire structure.

In the preferred embodiment as shown in the figures, a large central atrium space is created, as well as two different shapes of adjacent areas which may be used for other occupancies, circulations, storages, or other functions.

DESCRIPTION OF THE DRAWINGS

FIG. 1 is an elevation view of a six-sided convex polyhedron, showing one elevational side of the polyhedron only.

FIG. 2 is a perspective view of three, one-hundred twenty sided concave polyhedrons joined in a single framework structure, each of said three polyhedrons being made from the combination of twenty polyhedrons according to FIG. 4.

FIG. 3 is a perspective view of an interior of one of the structures shown in FIG. 2.

FIG. 4 is a perspective view of the six sided polyhedron taken along line A—A in FIG. 1.

DETAILED DESCRIPTION OF THE INVENTION

The present invention comprises a model of a previously unknown complex concave polyhedron formed from the addition of several six-sided convex polyhedrons.

A specific illustration of such a model can be made with reference to FIGS. 1 through 4.

FIG. 1 is an elevation view of a six-sided convex polyhedron having a base, 4, with sides of length x, and other edges, 5, of length 0.70711 x, comprising the basic module of the present invention. FIG. 1 is made from the joining of two polyhedrons of FIG. 4.

FIG. 2 is a perspective view of the joining of three one hundred-twenty sided concave polyhedrons, 8, according to the present invention, showing notation of some of the structures according to FIG. 1. Each of the three one hundred-twenty sided concave polyhedrons, 8, shown in FIG. 2 is made from twenty polyhedrons according to FIG. 1.

FIG. 3 is a perspective view of the interior of one of the one hundred-twenty sided concave polyhedrons, 8, shown in FIG. 2, seen from the central atrium space, and showing some of the adjacent void spaces, 9, and 10, and with some of the structures according to FIG. 1 notated.

Also shown are additional stiffeners, 6, and a floor level, 7.

The structures shown in the figures are comprised of simple linear strut members such as steel H sections or wood posts or the like, or may be comprised of planar diaphragm structures as known in the prior art, and are connected to each other by simple connectors, such as bolted connectors and plates or vertex connectors such as are known in the prior art.

In FIG. 2, #61 shows the coplanar bearing edges used to unite two polyhedrons, and #71 shows the coplanar edges used as bearing foundation. In FIG. 3, #12 shows five vertices of the interior dodecahedronal void space.

While discussion of the preferred embodiment has been made with reference to FIGS. 1 through 3, the figures are for purposes of illustration only and should not be interpreted as limitations upon the invention. It should be understood that various changes in material and construction may be made to the construction of the device disclosed herein, by one of ordinary skill in the art, without departing from the spirit and scope of the invention which is intended to be defined and limited solely by the appended claims.

What is claimed is,

1. A three dimensional, space enclosing structure or space enclosing, rigid structural framework comprising,
   at least three six-sided polyhedrons,
   said six-sided polyhedrons having six equal triangular sides,
   said six-sided polyhedrons being formed of the joining of two four-sided polyhedrons,
   said four-sided polyhedrons having an equilateral triangular base of edge length x and having three additional edges of length approximately 0.7x,
   said three six-sided polyhedrons being joined to each other at least along one of their edges of length x,
   one edge of length approximately 0.7x of two of said three polyhedrons being located in a coplanar orientation with each other.

2. A structure as in claim 1 where in 5 six-sided polyhedrons are joined together along edges of length x each polyhedron having one side in a substantially coplanar orientation with one side of the other four six-sided polyhedrons.

3. A structure as in claim 1 where in the resulting structure has an exterior shape of at least a partial triakis icosahedron and an interior shape of at least a partial great dodecahedron.

* * * * *

UNITED STATES PATENT AND TRADEMARK OFFICE
CERTIFICATE OF CORRECTION

PATENT NO. : 4,682,450

DATED : July 28, 1987

INVENTOR(S) : Gary Diamond

It is certified that error appears in the above-identified patent and that said Letters Patent is hereby corrected as shown below:

Column 2, line 24, "need" should read -- needed --.

Column 3, line 47, "a more useful a" should read -- a more useful --.

Column 3, line 59, "3" should read -- 4 --.

Column 4, line 24, "the" should read -- a --.

Column 4, line 25, "taken along line A-A in Figure 1" should read -- formed from the joining of two polyhedrons according to Figure 1 --.

Column 4, line 38, "Fig.1 is made from the joining of two polyhedrons of Fig. 4" should read -- Fig. 4 is made from the joining of two polyhedrons of Fig. 1, joined at their bases --.

Column 4, line 68, "3" should read -- 4 --.

Signed and Sealed this

Tenth Day of May, 1988

Attest:

*Attesting Officer*

DONALD J. QUIGG

*Commissioner of Patents and Trademarks*